United States Patent [19]

Avrillon et al.

[11] Patent Number: 5,076,816
[45] Date of Patent: Dec. 31, 1991

[54] GAS SEPARATION MEMBRANE

[75] Inventors: René Avrillon, Maison Laffite; André Descamps, Noisy le Roi; Alain Driancort, Bourg La Reine; Jean-Claude Mileo, Saint Ismier; Eric Robert, Rueil Malmaison, all of France

[73] Assignee: Institut Francais du Petrole, Rueil Malmaison, France

[21] Appl. No.: 566,689

[22] Filed: Aug. 14, 1990

[30] Foreign Application Priority Data

Aug. 14, 1989 [FR] France .................. 89 10958

[51] Int. Cl.$^5$ .................. B01D 53/22; B01D 71/64
[52] U.S. Cl. .......................... 55/16; 55/68; 55/158
[58] Field of Search .................. 55/16, 68, 158

[56] References Cited

U.S. PATENT DOCUMENTS

| Re. 30,351 | 7/1980 | Hohen et al. | 55/16 |
|---|---|---|---|
| 3,822,202 | 7/1974 | Hoehn | 55/16 |
| 4,378,324 | 3/1983 | Makino et al. | 264/41 |
| 4,378,400 | 3/1983 | Makino et al. | 55/16 X |
| 4,474,662 | 10/1984 | Makino et al. | 55/158 X |
| 4,512,893 | 4/1985 | Makino et al. | 55/158 X |
| 4,690,873 | 9/1987 | Makino et al. | 55/158 X |
| 4,705,540 | 11/1987 | Hayes | 55/158 X |
| 4,717,393 | 1/1988 | Hayes | 55/158 X |
| 4,717,394 | 1/1988 | Hayes | 55/158 X |
| 4,718,921 | 1/1988 | Makino et al. | 55/16 |
| 4,880,442 | 11/1989 | Hayes | 55/158 X |
| 4,897,092 | 1/1990 | Burgoyne, Jr. et al. | 55/16 |
| 4,932,982 | 6/1990 | Hayes | 55/158 X |
| 4,932,983 | 6/1990 | Hayes | 55/158 X |
| 4,948,400 | 8/1990 | Yamada et al. | 55/158 |
| 4,952,220 | 8/1990 | Langsam et al. | 55/158 |
| 4,954,144 | 9/1990 | Burgoyne, Jr. et al. | 55/158 X |
| 4,968,331 | 11/1990 | Sakashita et al. | 55/158 |
| 4,981,497 | 1/1991 | Hayes | 55/158 X |
| 4,983,191 | 1/1991 | Ekiner et al. | 55/158 |

FOREIGN PATENT DOCUMENTS

| 0321638 | 6/1989 | European Pat. Off. | 55/158 |
|---|---|---|---|
| 58-008512 | 1/1983 | Japan | 55/158 |
| 59-225705 | 12/1984 | Japan | 55/158 |
| 60-022902 | 2/1985 | Japan | 55/158 |
| 60-071023 | 4/1985 | Japan | 55/158 |
| 60-082103 | 5/1985 | Japan | 55/158 |
| 60-125210 | 7/1985 | Japan | 55/158 |
| 60-257805 | 12/1985 | Japan | 55/158 |
| 62-074410 | 4/1987 | Japan | 55/158 |
| 62-074411 | 4/1987 | Japan | 55/158 |
| 62-114628 | 5/1987 | Japan | 55/158 |
| 63-012302 | 1/1988 | Japan | 55/158 |
| 63-028424 | 2/1988 | Japan | 55/158 |
| 63-166415 | 7/1988 | Japan | 55/158 |
| 63-190607 | 8/1988 | Japan | 55/158 |
| 63-264121 | 11/1988 | Japan | 55/158 |
| 63-278524 | 11/1988 | Japan | 55/158 |
| 1-194904 | 8/1989 | Japan | 55/158 |
| 1-194905 | 8/1989 | Japan | 55/158 |

Primary Examiner—Robert Spitzer
Attorney, Agent, or Firm—Millen, White & Zelano

[57] ABSTRACT

A gas separation membrane, comprising a film with a thickness ranging from $0.05\cdot10^{-6}$ to $20.10^{-6}$ m, at least 90% by mole of which is at least one aromatic polyimide or copolyimide, the recurrent unit of which corresponds to the following formula (I):

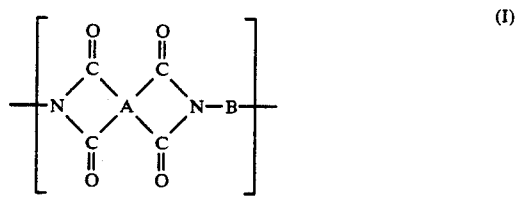

where A represents a tetravalent aromatic radical or a mixture of tetravalent aromatic radicals, and
B represents a bivalent aromatic radical at least 50% by mole of which has the following formula (II):

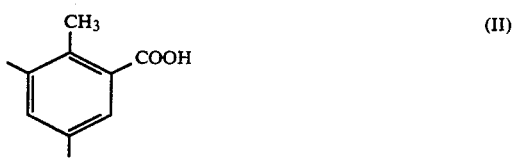

formula (I) being differnt from the following formula (III):

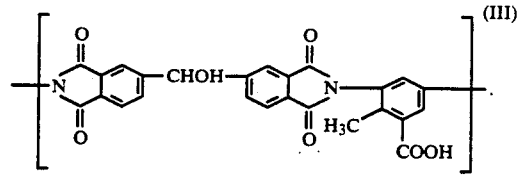

9 Claims, No Drawings

GAS SEPARATION MEMBRANE

BACKGROUND OF THE INVENTION

The present invention relates to a gas separation membrane comprising at least one thin film mainly containing at least one particular aromatic polyimide or copolyimide, preferably prepared from 2-methyl 3,5-diamino benzoic acid.

The use of aromatic polyimides in gaseous permeation membranes has been notably described in U.S. Pat. Nos. 4,378,324, 4,378,400, 4,512,893, 4,705,540, 4,717,393, 4,717,394 and 4,718,921.

None of these patents mentions the use of 2-methyl 3,5-diamino benzoic acid for preparing polyimides that can be utilized for gas separation.

DETAILED DESCRIPTION OF THE INVENTION

The membrane according to the invention allows, in relation to the membranes in prior art, a more efficient gas separation. The polyimide or copolyimide contained in said membrane shows, on one hand, an excellent solubility in most of the usual solvents utilized for preparing the membranes and, on the other hand, a very good selectivity for gas separation, while having a very satisfactory gas permeability.

The gas separation membrane according to the invention comprises at least one film of a thickness advantageously ranging from $0.05 \cdot 10^{-6}$ to $20 \cdot 10^{-6}$ m, preferably from $0.1 \cdot 10^{-6}$ to $15 \cdot 10^{-6}$ m, at least 90% by mole of which, preferably at least 95% by mole, are at least one aromatic polyimide or copolyimide the recurrent unit of which has the following formula (I):

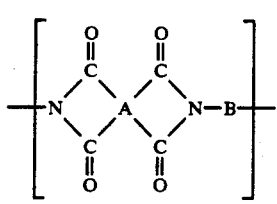
(I)

where A represents a tetravalent aromatic radical or a mixture of tetravalent aromatic radicals,
and B represents a bivalent aromatic radical at least 50% by mole of which are represented by the following formula (II):

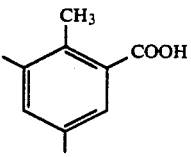
(II)

said formula (I) being different from the following formula (III):

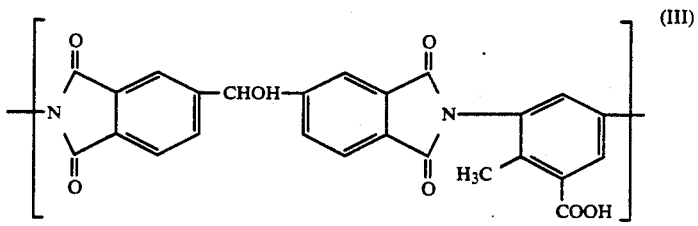
(III)

A can notably represent at least one radical, which may be substituted selected from those represented hereafter:

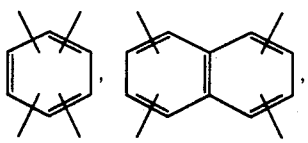

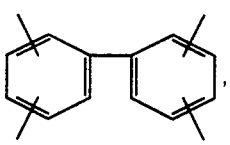

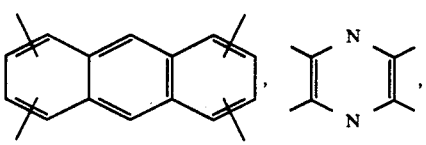

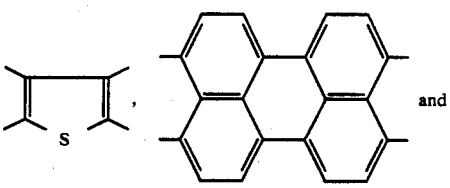

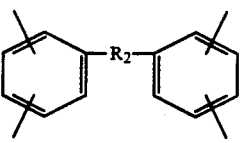

where $R_2$ represents a bivalent radical selected from the following radicals: —O—, —S—, —$SO_2$—, —CO—, —$CH_2$—, —$C(CH_3)_2$—, and —CHOH— (in the case when less than 100% by mole of B are represented by said formula (II)) and —$C(CF_3)_2$—.

Said aromatic polyimide or copolyimide contained in the gas separation membrane according to the invention is advantageously prepared by reacting (in a polycondensation reaction), in an appropriate solvent and generally in stoichiometric conditions or in conditions close to stoichiometry (deviation generally lower than 30%, preferably 10% by mole in relation to the stoichiometric proportions):

on one hand:
at least one tetra-ester or one diacid-diester derived from at least one tetracarboxylic aromatic acid and represented by the following formula (IV):

$$\begin{array}{c} RO_2C \diagdown \phantom{xx} \diagup CO_2R \\ R_1 \\ R'O_2C \diagup \phantom{xx} \diagdown CO_2R' \end{array} \quad (IV)$$

or at least one dianhydride derived from at least one tetracarboxylic aromatic acid and represented by the following formula (V):

(V)

where, in formulas (IV) and (V), R and R', identical or different, are monovalent radicals or hydrocarbons each one having 1 to 13 atoms or carbon, for example lower alkyls containing 1 to 13 atoms of carbon, cycloalkyls or aryls having 6 to 13 atoms or carbon, and R can also represent hydrogen (R' being then defined as above); $R_1$ is a tetravalent radical, which may be substituted preferably selected from those represented hereafter:

where $R_2$ represents a bivalent radical selected from the following radicals: —O—, —S—, —$SO_2$—, —CO—, —$CH_2$—, —$C(CH_3)_2$— and —$C(CF_3)_2$—, with, on the other hand:
either 2-methyl 3,5-diamino benzoic acid of formula or a mixture containing:
* 50 to 95% by mole of 2-methyl 3,5-diamino benzoic acid of formula and
* 5 to 50% by mole of at least one aromatic diamine represented by the following formula (VI):

$H_2N—R_3—NH_2$ (VI)

where $R_3$ is a bivalent radical corresponding to one of the following formulas (VII) to (XII):

(VII)

(VIII)

-continued

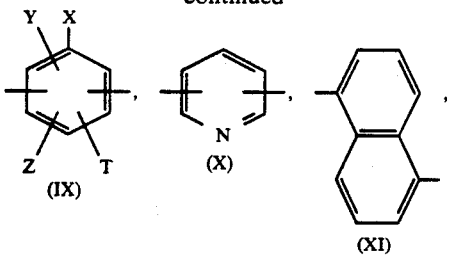

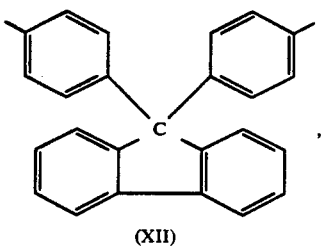

formula (IX) being different from

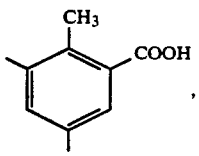

X,Y,X$_1$,Y$_1$,Z,T, identical or different, being selected from hydrogen, the hydroxyl-OH radical, the carboxyl-COOH radical, the alkyl or alkoxy radicals having 1 to 3 atoms of carbon; R$_4$ being a bivalent radical selected from the following radicals: —O—, —S—, —SO$_2$—, —CO—, —CH$_2$—, —C(CH$_3$)$_2$—, —C(CF$_3$)$_2$—.

In the case when the preparation is carried out with a mixture of 2-methyl 3,5-diamino benzoic acid and at least one aromatic diamine of formula (VI), R$_2$ can also represent the —CHOH— radical.

The polycondensation reaction can be carried out according to any conventional process, preferably according to the process described in U.S. Pat. No. 4,736,015.

Among the tetra-esters or diacid-diesters derived from at least one tetracarboxylic aromatic acid which can be used for preparing the polyimides or the copolyimides considered in the present invention, the following can be cited: the symmetric tetra-esters, i.e. the compounds of formula (IV) in which radicals R and R' are identical, such as tetramethyl ester, tetraethyl ester, tetrabutyl ester; the dissymmetric tetra-esters represented by formula (IV) with radicals R and R', different alkyl and/or aryl, different such as diphenyl dimethyl ester, dibutyl dimethyl ester, diphenyl diethyl ester; the bis(ortho-acid-esters) more commonly called diesters, i.e. the compounds of formula (IV) in which R is hydrogen and R' an alkyl radical, such as for example methyl diester, ethyl diester, n-propyl diester, isopropyl diester, n-butyl diester, isobutyl diester, amyl diester, hexyl diester, 2-hydroxyethyl diester.

Most generally, the dissymmetric tetra-esters and the diesters are not pure compounds but a mixture of isomers; for example, the methyl diester can be a mixture, in variable proportions, of 3,3'-dicarboxy 4,4'-dimethoxycarbonyl, of 4,4'-dicarboxy 3,3'-dimethoxycarbonyl and of 3,4'-dicarboxy 4,3'-dimethoxycarbonyl of the considered acids.

According to a preferred preparation embodiment, at least one aromatic polyimide or copolyimide is prepared by dissolving in an appropriate solvent 2-methyl 3,5-diamino benzoic acid, possibly at least one aromatic diamine of formula (VI), and a preferably substantially equimolecular amount of at least one compound of formula (IV) or (V). The reaction mixture formed by the solvent and the reagents is then heated up to a temperature advantageously higher than 80° C., generally ranging from 80° to 400° C., preferably from 100° to 250° C., until the composition reaches the required viscosity. The temperature is generally set at such a value that the reaction of the amine functions on the tetracarboxylic acid(s) derivatives is carried out at a reasonable velocity.

The solvents with which the polyimides or copolyimides considered in the invention are prepared are usually polar organic compounds, i.e. comprising a heteroatom such as O, N, S, P, inert in relation to the monomers and the polymers. Among these solvents, the following can be notably cited: the phenols, such as phenol, the cresols, the xylenols, the chlorophenols, the mono and diethers of glycols, such as for example those of ethyleneglycol and of diethyleneglycol, the amides, such as for example methylformamide, dimethylformamide, hexamethylphosphotriamide, methylacetamide, dimethylacetamide, the ureas, such as for example tetramethylurea, the heterocyclic compounds, such as for example pyridine, quinoline, dioxane, tetrahydrofurane, N-methylpyrrolidone, N-acetylpyrrolidone, tetramethylenesulfone, the sulfones and sulfoxides, such as for example dimethylsulfone and dimethylsulfoxide These solvents can be used alone or mixed together, or else mixed with other liquid organic compounds such as alcohols, including methanol, ethanol, propanol, isopropanol, the butanols, benzyl alcohol; the ketones, such as for example acetone, 2-butanone, methylisobutylketone, diisopropylketone, cyclohexanone, acetophenone; the aromatic hydrocarbons, such as benzene, toluene, the xylenes, the solvent naphtha; the halogenated aromatic hydrocarbons, such as chlorobenzene, the dichlorobenzenes, the chlorotoluenes; the aliphatic and aromatic esters of the aliphatic and aromatic carboxylic acids, such as for example the acetates of methyl, of isopropyl, of butyl, of phenyl, methyl benzoate; ethers, such as dibutyl ether, diphenyl ether.

The initial concentration of monomers in the reaction solvent is not critical, but it generally ranges between 10 and 80% by weight.

The volatile products (water and/or alcohols) formed during the reaction can be left in the medium, but they can also be removed by distillation as they form, which allows controlling the extent of the reaction.

The film contained in the gas separation membranes according to the invention is usually prepared by dissolving said polyimide(s) or copolyimide(s), for example at a temperature ranging between the room temperature and 150° C., at a concentration generally ranging from 3 to 35%, preferably from 5 to 25% by weight, in at least one appropriate organic solvent.

Said solvent is for example selected, according to the solubility of the polyimide or copolyimide, from among N-methylpyrrolidone, dimethylformamide, dimethylacetamide, dimethylsulfoxide, o-, m- or p-cresol, the phenolic derivatives, the halogenated hydrocarbons, dioxane and tetrahydrofurane.

The obtained solution is generally cooled down to room temperature (between 15° and 25° C.) and preferably filtered and degassed. The solution is then spread with a commercial knife or bar applicator on a plane (support) such as a glass plate, in order to obtain a film of said solution with a thickness generally ranging from 10 to $200.10^{-6}$ m, preferably from 30 to $150.10^{-6}$ m.

The solvent is then progressively evaporated step by step, generally under vacuum or under a stream of inert gas(es), for example at temperatures ranging from 80 to 220° C. for 6 to 22 hours. The polyimide(s) or copolyimide(s) film obtained thereby is then detached from the support, for example by immersing the set formed by the film and the support in one or several successive water baths, at temperatures generally different and ranging for example from 10° to 80° C. The film is then dried again under vacuum or under a stream of inert gas(es), preferably step by step, for example at temperatures ranging from 80° to 400° C., preferably from 90° to 350° C., for 6 to 22 hours. This final thermal treatment generally allows improving the permeametric properties of said film.

A dense film is thus obtained, the thickness of which ranges from $0.05.10^{-6}$ to $20.10^{-6}$ m, preferably from $0.1.10^{-6}$ to $15.10^{-6}$ m. Too thick a film would have a low permeability, whereas too thin a film would show an extreme sensitivity to the slightest defect, which might lead to a non-selective flow of gases.

The separation membranes according to the invention generally comprise, apart from said dense film, at least one porous structure supporting said film; in that case, these are called membranes of the asymmetric type. These asymmetric structures can be for example directly obtained with the conventional phase inversion techniques or by the controlled deposition of a dense film on an already existing porous structure; in the latter case, they are called composite membranes. These membranes have for example a plane or a filamentary shape, or else the form of hollow tubes or fibers.

The separation membranes according to the invention can be notably utilized for the dehydration or the deacidizing of a mixture of gaseous hydrocarbons, for the separation of hydrogen from a mixture of gaseous hydrocarbons, for the separation between oxygen and nitrogen and, more generally, in gas separation processes.

The examples hereafter illustrate the invention without however limiting the scope thereof.

In these examples, the intrinsic viscosity is determined at 30° C. in N-methylpyrrolidone.

The measuring of permeability to hydrogen, to carbon monoxide, to methane, to oxygen and to nitrogen is carried out on the dense polyimide or copolyimide films at 20° C., at an upstream pressure of 1 MPa and vacuum downstream. The measuring of permeability to water is achieved at 50° C. with nitrogen loaded with steam. The upstream pressure is 1 MPa, the partial water pressure is 0.5 and vacuum is applied downstream.

The permeability to the different gases is calculated by means of the following formula:

$$P = \frac{V}{t \cdot \Delta P} \cdot \frac{1}{A}$$

It is expressed in $cm^3/(cm^2.s.cm\ Hg)$.

V represents a volume of gas (in $cm^3$, NTP) passing across the dense film, t represents the permeation duration (in s), $\Delta P$ represents the considered gas pressure difference between the upstream and downstream faces of the film and A represents the surface of the film.

The permeability coefficient is calculated by means of the following formula:

$$\rho = P \times e$$

and is expressed in barrers (1 barrer = $10^{-10}$ $cm^3.cm/(cm^2\ s.\ cm\ Hg)$) where P represents the measured permeability and e the thickness of the film.

The selectivity for the separation of two gases i and j is given by the following formula:

$$\chi i/j = \rho i/\rho j$$

where $\rho i$ and $\rho j$ are respectively the permeability coefficients of gases i and j.

EXAMPLE 1

A mixture of 444 g of dianhydride of diphenyl di(trifluoromethyl) methane 3,3',4,4'-tetracarboxylic acid and of 166.2 g of 2-methyl 3,5-diamino benzoic acid in 610 g of m-cresol is heated in a nitrogen stream and under stirring in an oil bath which allows progressively increasing the temperature of the mixture up to 200° C. The temperature stages are 1 hour at 50° C., 1 hour at 110° C., 1 hour at 150° C. and 2 hours at 180° C., 1 hour at 190° C. and 2 hours at 200° C. During the reaction, m-cresol is progressively added in order to bring the dry product concentration to about 30% by weight at the end of the temperature cycle.

The solution obtained is diluted to obtain a dry product concentration ranging from 15 to 20% by weight, then (hot) filtered and precipitated with a strong stirring in a large excess of methanol (of about 10 volumes for 1 volume of solution). The mixture obtained is filtered in order to separate the polymer particles. The polymer is washed again several times with water, then dried at 90° C. in a vacuum chamber for 24 hours.

The polyimide prepared thereby shows an intrinsic viscosity of 0.74 dl/g.

EXAMPLE 2

10 g of the polyimide prepared in example 1 is dissolved under stirring in 90 g of N-methylpyrrolidone at a temperature of about 100° C. The solution is cooled down to the room temperature, filtered on a 0.5 micron FLUOPORE filter and degassed.

Under a class 100 light flux hood, the solution is spread by means of a bar applicator on a glass plate in order to obtain a solution film with a thickness of about $100.10^{-6}$ m.

The solvent is evaporated under vacuum for 8 hours at 100° C. and 4 hours at 180° C. The polyimide film is then detached from the support by alternately plunging it into water at 20° C. and water at 60° C. This film is then dried again under vacuum for 8 hours at 100° C. and 4 hours at 180° C.

A dense film with a thickness of $10.10^{-6}$ m is thus obtained. This film is subjected to a thermal treatment at 280° C. for 4 hours in a nitrogen stream.

The results of the permeability tests are shown in the table hereafter.

EXAMPLE 3

The polyimide film of example 1 is prepared according to the process of example 2, but it is subjected to a thermal treatment at 300° C. for 4 hours in a nitrogen stream.

The results of the permeability tests are shown in the table hereafter.

| Example | p (barrer) | | | | α | | |
|---|---|---|---|---|---|---|---|
| | $H_2$ | $CO_2$ | $CH_4$ | $O_2$ | $_2/CH_4$ | $CO_2/CH_4$ | $O_2/N_2$ |
| 2 | 68 | 24 | 0.30 | 5.6 | 226 | 80 | 6.6 |
| 3 | 90 | 26 | 0.46 | — | 195 | 56 | — |

We claim:

1. A gas separation membrane comprising at least one film of a thickness ranging from $0.05.10^{-6}$ to $20.10^{-6}$ m, at least 90% by mole of which is at least one aromatic polyimide or copolyimide, the recurrent unit of which has formula (I):

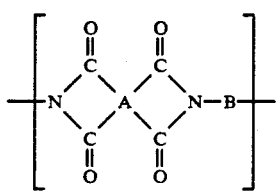

(I)

where
A represents a tetravalent aromatic radical or a mixture of tetravalent aromatic radicals, and
B represents a bivalent aromatic radical, at least 50% by mole of which have formula (II):

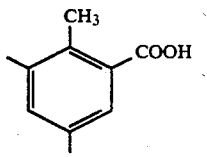

(II)

said formula (I) being different from the following formula (III):

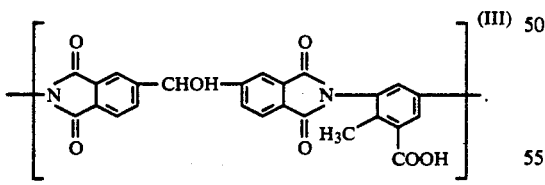

(III)

2. A membrane according to claim 1 wherein least 95% by mole of said film is at least one aromatic polyimide or copolyimide the recurrent unit of which corresponds to said formula (I), said formula (I) being different from said formula (III).

3. A membrane according to claim 1 wherein said film has a thickness ranging from $0.1.10^{-6}$ to $15.10^{-6}$ m.

4. A membrane according to claim 1, wherein said aromatic polyimide or copolyimide is prepared by reacting at least one tetra-ester or one diacid-diester derived from at least one tetracarboxylic aromatic acid, said tetra-ester or diacid-diester having the following formula (IV):

(IV)

or at least one dianhydride derived from at least one tetracarboxylic aromatic acid and, said dianhydride having the following formula (V):

(V)

where, in formulas (IV) and (V), R and R', identical or different, are monovalent radicals or hydrocarbons, each one having 1 to 13 atoms or carbon, and R can also be hydrogen; $R_1$ is a tetravalent radical, optionally substituted, selected from those represented hereinafter:

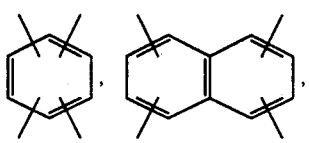

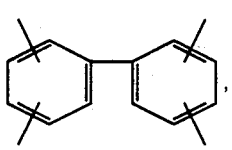

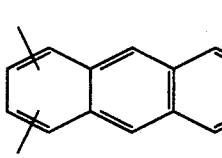

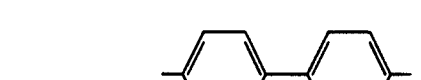

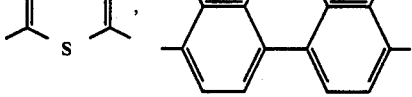

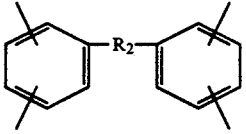

where $R_2$ represents a bivalent radical selected from the group consisting of the following radicals: —O—, —S—, —$SO_2$—, —CO—, —$CH_2$—, —$C(CH_3)_2$— and —$C(CF_3)_2$, with 2-methyl 3,5-diamino benzoic acid.

5. A membrane according to claim 1, wherein said aromatic polyimide or copolyimide is prepared by reacting at least one tetra-ester or one diacid-diester derived from at least one tetracarboxylic aromatic acid and represented by the following formula (IV):

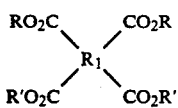  (IV)

or at least one dianhydride derived from at least one tetracarboxylic aromatic acid and represented by the following formula (V):

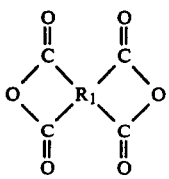  (V)

where, in formulas (IV) and (V), R and R', identical or different, are monovalent radicals or hydrocarbons, each one having 1 to 13 atoms of carbon, and R can also be hydrogen; $R_1$ is a tetravalent radical, optionally substituted, selected from the group consisting of:

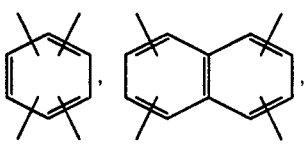

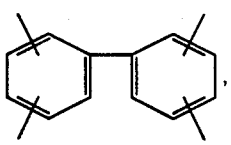

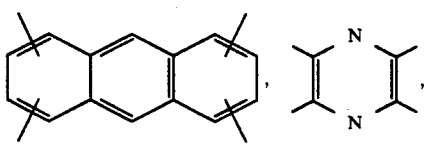

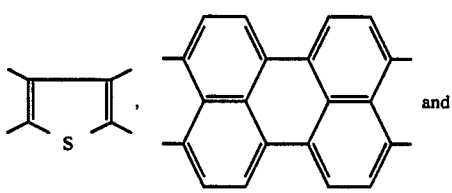 and

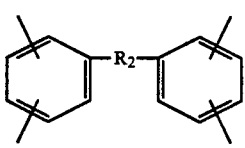

where $R_2$ is a bivalent radical selected from the group consisting of the following radicals: —O—, —S—, —SO$_2$—, —CO—, —CH$_2$—, —C(CH$_3$)$_2$—, —CHOH— and —C(CF$_3$)$_2$,
with a mixture containing

* 50 to 95% by mole of 2-methyl 3,5-diamino benzoic acid, and
* 5 to 50% by mole of at least one aromatic diamine of the following formula (VI):

$H_2N-R_3-NH_2$  (VI)

where $R_3$ is a bivalent radical of one of the following formulas (VII) to (XII):

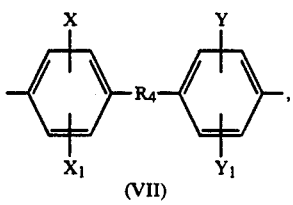
(VII)

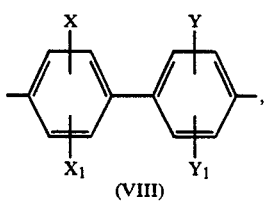
(VIII)

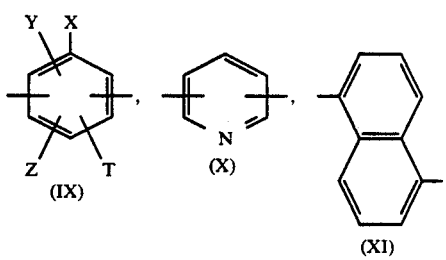
(IX) (X) (XI)

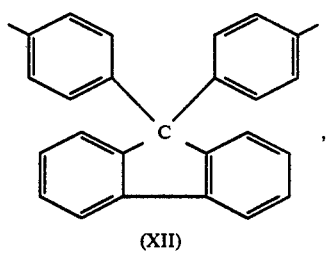
(XII)

the formula (IX) being different from

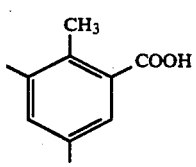

X, Y, $X_1$, $Y_1$, Z, and T, identical or different, being selected from the group consisting of H, OH, COOH, $C_{1-3}$—alkoxy; $R_4$ is a bivalent radical selected from the group consisting of the following radicals: —O—, —S—, —SO$_2$—, —CO—, —CH$_2$—, —C(CH$_3$)$_2$—, and —C(CF$_3$)$_2$—.

6. A process for the dehydration of a mixture of gaseous hydrocarbons, comprising passing said mixture through a membrane of claim 1 under dehydration conditions.

7. A process for the deacidizing of a mixture of gaseous hydrocarbons, comprising passing said mixture through a membrane of claim 1 under deacidization conditions.

8. A process for the separation of hydrogen from a mixture of gaseous hydrocarbons, comprising passing said mixture through a membrane of claim 1 under separation conditions.

9. A process for the separation of components of a mixture of oxygen and nitrogen, comprising passing said mixture through a membrane of claim 1 under separation conditions.

* * * * *